United States Patent Office 3,274,225
Patented Sept. 20, 1966

3,274,225
METHOD FOR PRODUCING ORGANIC POLYISO-
CYANATES SUBSTANTIALLY FREE OF SEDI-
MENT
James H. Saunders, Bridgeville, Pa., and Eugene L.
Powers, New Martinsville, W. Va., assignors to
Mobay Chemical Company, Pittsburgh, Pa., a cor-
poration of Delaware
No Drawing. Filed Jan. 4, 1963, Ser. No. 249,331
4 Claims. (Cl. 260—453)

This invention relates to organic polyisocyanates and more particularly, to organic polyisocyanates based on aromatic amines which are linked together by aliphatic carbon atoms which contain a minimum amount or no sediment.

The organic polyisocyanates based on aromatic amines which contain an aliphatic chain linking two or more aromatic ring systems have become commercially important for the production of foams, moldings, castings, coatings, adhesives, putties and the like. A particularly useful compound is p,p'-diphenyl methane diisocyanate and the crude product containing a large amount of this compound which is obtained by the phosgenation of the reaction product of aniline with formaldehyde. The product of this phosgenation reaction contains a mixture of diisocyanates, triisocyanates, tetraisocyanates and even some penta- and higher polyisocyanates. The product of the initial phosgenation reaction frequently contains a great deal of unidentified sediment. If the normal process of reaction is followed wherein the maximum temperature in the course of the reaction and subsequent solvent removal is about 175° C. and then the reaction mixture is allowed to slowly cool to room temperature, as much as 10 percent by weight of the reaction product is solid by-products which will not become liquid again when heated above room temperature or even to 60° C.

It has been proposed heretofore to filter out the by-products resulting from this irreversible freezing. Of course, the filtration is very expensive and unless the products are removed by filtration, they remain in the product and cause clogging of the mixing apparatus used in the preparation of polyurethane foam, for example. The problem with crude isocyanates of this type is not solved by the conventional procedure of collecting, for example, 4, 4'-diisocyanato diphenyl methane at 50 to 70° C. and then chilling it to a temperature of about 0° C.

It is therefore an object of this invention to provide organic polyisocyanates and a method for the production thereof which are substantially free of the foregoing disadvantages. In other words, the primary object of this invention is to provide a method of reducing the sediment in organic polyisocyanates prepared by the phosgenation of aromatic amines which contain at least two aromatic nuclei linked together by one or more aliphatic carbon atoms. A further object of this invention is to provide a method of preventing the formation of sediment in the production of aromatic polyisocyanates based on aromatic amines and aldehydes or ketones. A further object of this invention is to provide crude aromatic polyisocyanates which are easier to mix with organic compounds containing active hydrogen containing groups to prepare polyurethane plastics. Another object of this invention is to provide an improved crude, p,p'-diphenyl methane diisocyanate which has less sediment than heretofore known crude p,p'-diphenyl methane diisocyanates.

The foregoing objects and others which will become apparent from the following description are accomplished in accordance with this invention, generally speaking, by providing aromatic polyisocyanates which are substantially free of sediment produced by a process which comprises phosgenating an amine obtained by a process which comprises reacting an aromatic amine with an aldehyde or a ketone to prepare an aromatic polyisocyanate and heating the resulting aromatic polyisocyanate to a temperature of at least about 225° C. for less than enough time to cause polymerization of the isocyanate and preferably a maximum of about one minute and then quenching the aromatic polyisocyanate by reducing its temperature to a level below about 50° C. substantially immediately and preferably in less than about three minutes. Thus, this invention contemplates a method of producing aromatic polyisocyanates which are substantially free of sediment. The aromatic polyisocyanates of the invention are based on aromatic polyamines which are prepared by reacting aromatic amines and aldehydes or ketones to form aromatic polyamines which contain at least two aromatic nuclei linked together by at least one aliphatic carbon atom. The prime example of the aromatic polyamine contemplated for reaction with phosgene is 4,4'-diamino diphenyl methane, or in other words, the reaction product of aniline with formaldehyde. In the course of the phosgenation and subsequent distillation procedure, the reaction temperature reaches a maximum of about 175° C. It is held at this temperature until substantially all of the residual solvent has been removed and then the temperature is rapidly increased from the maximum reaction temperature to at least about 225° C. and preferably above 235° C. for a maximum of about one minute and preferably for about 10 to 40 seconds. Then, the reaction mixture is rapidly cooled in less than three minutes and preferably in less than two minutes to a temperature below 50° C. and preferably below 40° C. An aromatic polyisocyanate is thus obtained which has a very low level of sediment. Indeed, in many cases, the sediment which is below about 0.2 percent by weight cannot be detected.

The invention is applicable to reducing solids in aromatic isocyanates of the type described above which have been prepared and allowed to cool without quenching of their own accord. Thus, one may heat such an isocyanate to a temperature of at least about 225° C. for a brief time, less than enough to cause polymerization and then rapidly cool it to less than 50° C. An original solids content of 10 percent by weight is thus reduced to less than 1 percent by weight.

Any suitable aromatic amine may be used such as, for example, aniline, o-, m- and p-toluidine, xylene amine, tolylene diamine including 2,4- and 2,6-tolylene diamine, o-, m-, and p-xylylene diamine and the like. It is preferred to use aniline. Any suitable aldehyde may be used such as, for example, formaldehyde, acetaldehyde, propionaldehyde, butyraldehyde, n-heptaldehyde, benzaldehyde cyclohexane aldehyde and the like. Any suitable ketone may be used such as, for example, acetone, methyl ethyl ketone, methyl-n-propyl ketone, diethyl ketone, hexanone-2, hexanone-3, di-n-propyl ketone, di-n-heptyl ketone, benzophenone, dibenzyl ketone, cyclohexanone and the like. It is preferred to react formaldehyde with the aromatic amine. Any suitable method of reacting the aldehyde and/or acetone with the amine may be used, but it is preferred to carry out the reaction under acidic conditions and more preferably in the presence of HCl at a temperature of from about 90 to about 100° C. for a sufficient time to allow reaction of the amine and aldehyde or ketone to go to completion. By way of illustration, crude diphenyl methane diamine is the reaction product of aniline and formaldehyde in the presence of HCl and contains some triamines and even higher polyamines. It may be prepared by reacting about 60 parts of aniline with about 25 parts of foramldehyde (37 percent aqueous) and about 74 parts of HCl (30 percent aqueous) at a temperature of about 90° C. to about 100° C. for about 1.5 to about 2 hours. In order to separate out the crude amine, the acidic reaction mixture is reacted with an equivalent amount of sodium hydroxide and crude amine is separated from the salt layer. It is preferred to distill out any unreacted aniline before phosgenating.

The amine prepared by reaction of an aldehyde or ketone with an aromatic amine may then be reacted with phosgene by any suitable process to prepare an aromatic polyisocyanate. The methods heretofore used in the prior art are satisfactory including the method disclosed in U.S. Patent 2,908,703. A satisfactory process for phosgenating the reaction mixture set forth above prepared from 60 parts of aniline and 25 parts of formaldehyde is to combine 100 parts of phosgene with the 85 parts of crude amine obtained until a product having an amine equivalent of about 135 and containing about 31 percent free —NCO is obtained by first reacting the crude amine with an excess of the phosgene at a temperature below about 60° C. until a carbamyl chloride-amine hydrochloride is obtained and then reacting the carbamyl chloride-amine hydrochloride slurry with further phosgene at a temperature close to the boiling point of the solvent or above about 80° C. until the crude aromatic polyisocyanate is obtained. This crude product will usually contain more than 0.5 percent by weight of sediment after solvent removal, cooling and storage.

The method of the invention is applicable to crude polyisocyanates prepared from either refined or crude aromatic polyamines. The problem surprisingly exists to a greater degree where the refined polyamines are used as starting materials than it does where a crude polyamine is used as a starting material. Thus, one advantageous embodiment of the invention is to begin the preparation of the aromatic polyisocyanate with the crude reaction product obtained from an aromatic primary monoamine such as aniline and a low molecular weight aldehyde or ketone such as formaldehyde or acetone and phosgenate this crude reaction product. Then, before allowing the reaction mixture to cool, in other words while it is at its maximum temperature, it is further heated rapidly to a temperature of a least about 235° C. and preferably in the range of from about 235° C. to about 250° C. for a period of about 10 to 30 seconds and then it is cooled in less than two minutes to a temperature below about 40° C. Such a product will contain less than one percent sediment if it is based on aniline and formaldehyde for the preparation of the aromatic polyamine which is subsequently reacted with phosgene.

The aromatic polyisocyanates of the invention are useful for the preparation of cellular polyurethane plastics and may in turn be used for the preparation of insulation, for packaging, seat cushions, shoe soles as well as in the production of elastomeric materials which are useful in such final products as shoe heels, gear wheels and the like as well as in the production of coating compositions including the heretofore known caulks, sealants, putties and surface coatings.

The invention is further illustrated by the following examples in which the parts are by weight unless otherwise indicated.

Example 1

About 120 mols of aniline are used with about 120 mols of 32 percent aqueous HCl with cooling to maintain the temperature at about 75° C. To this solution is added about 50 mols of 37 percent aqueous formaldehyde while maintaining the temperature below about 50° C. The resulting reaction mixture is maintained at about 90 to 100° C. for about 3 hours and then about 122 mols of NaOH (50 percent aqueous solution) are added. When the NaOH is added, the reaction mixture separates into an oil phase and an aqueous phase. The latter is removed. Residual water and unreacted aniline are removed from the oil phase by distillation starting at about 100° C. and reducing the pressure sufficient to remove substantially all of the unreacted aniline at a pot temperature below about 250° C. The crude amine is recovered by filtration and is refined by distillation under reduced pressure. About 100 parts of the refined amine are mixed with ortho-dichlorobenzene and the resulting solution is added to about 200 parts of phosgene dissolved in about 1100 parts of ortho-dichlorobenzene with cooling while maintaining the temperature below about 75° C. A slurry is obtained which is heated to the boiling point of the mixture while an additional 200 parts of phosgene are added to complete the reaction. The resulting solution is heated and thus distilled under about 50 mm. Hg pressure until a pot temperature of about 140° C. is reached. Then, the pressure is gradually reduced, while maintaining the pot temperature at about 140° C., to about 10 mm. Hg. The final traces of solvent are moved by raising the temperature to about 175° C. while maintaining the pressure at about 10 mm. Hg.

Then, the reaction product is heated rapidly to a temperature of about 235° C. and held at that temperature for about 10 seconds. Then, the reaction mixture is passed through a water-jacketed pipe and thereby cooled in less than two minutes to about 40° C. the resulting product has an average solids content at 25° C. of about 0.2 percent by weight. A product which had been allowed to cool to room temperature from 175° C. of its own accord without rapid cooling had a solids content of 3 percent by weight.

Example 2

Example 1 is repeated except that the distillation of the crude amine is omitted and the crude product is phosgenated. The product after treatment has a viscosity at 25° C. of 285 centipoises whereas the product which was allowed to cool from 175° C. to room temperature without heating and quenching followed by storage for about 1 month had a viscosity at 25° C. of 490 centipoises. Furthermore, the product prepared without heating and rapid quenching contained about 1.5 percent by weight solids, whereas that prepared with heating and rapid cooling contained only about 0.2 percent by weight of solids.

Example 3

A mixture of aromatic polyisocyanates prepared by the process of Example 1 which had been allowed to cool to room temperature from 175° C. of its own accord without rapid cooling and which contained 10 percent by weight of solids and had a viscosity at 25° C. of about 550 centipoises is heated to a temperature of about 235° C. for about 60 seconds and then quenched in accordance with the process of Example 1 in less than 2 minutes to about 50° C. This treatment is repeated until the product which originally contained 10 percent by weight of solids, only contains about 1 percent by weight of solids after the heating and cooling step. The viscosity of the final product is reduced to about 350 centipoises at 25° C. and the assay is improved by 1 percent from 88 percent diisocyanate to 89 percent diisocyanate.

It is to be understood that the foregoing working examples are given for the purpose of illustration and that any other suitable aromatic amine, aldehyde, ketone or the like could have been used herein provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method of producing an aromatic polyisocyanate which is substantially free of sediment which comprises
    (a) phosgenating a polyamine obtained by a process which comprises reacting an aromatic amine with a member selected from the group consisting of aldehydes and ketones to prepare an aromatic polyisocyanate,
(b) heating the resulting aromatic polyisocyanate to a temperature of at least about 225° C. for a maximum of about one minute, and
(c) quenching the reaction mixture containing said aromatic polyisocyanate to a temperature below about 50° C. in less than about three minutes.

2. The method of claim 1 wherein said aromatic polyamine is obtained by a process which comprises reacting aniline with formaldehyde.

3. A method of producing an aromatic isocyanate which is substantially free of sediment which comprises phosgenating an amine obtained by a process which comprises reacting an aromatic amine with a member selected from the group consisting of aldehydes and ketones, maintaining said aromatic isocyanate at an elevated temperature of at least about 225° C. for less than enough time to cause polymerization of said aromatic isocyanate and cooling it to a temperature below about 50° C. in less than about 3 minutes.

4. A method of producing an aromatic polyisocyanate which is substantially free of sediment which comprises
(a) phosgenating crude 4,4'-diamino diphenyl methane to prepare a reaction mixture containing an aromatic polyisocyanate by a process which comprises reacting said crude 4,4'-diamino diphenyl methane with phosgene at a temperature of from about 0° C. to about 175° C.,
(b) heating the resulting aromatic polyisocyanate to a temperature within the range of from about 235° C. to about 250° C. for from about 10 to about 30 seconds and
(c) quenching to a temperature below about 40° C. in less than about two minutes whereby a product which contains less than about one percent by weight of sediment is obtained.

References Cited by the Examiner
UNITED STATES PATENTS

| | | | |
|---|---|---|---|
| 2,683,730 | 7/1954 | Seeger et al. | 260—453 |
| 3,163,666 | 12/1964 | Kirss et al. | 260—453 |

CHARLES B. PARKER, *Primary Examiner.*

STANLEY H. LIEBERSTEIN, DALE F. MAHANAND, *Assistant Examiners.*